Nov. 23, 1965 D. J. BULIC 3,219,809
GLARELESS HEADLIGHT
Filed May 31, 1963 2 Sheets-Sheet 1
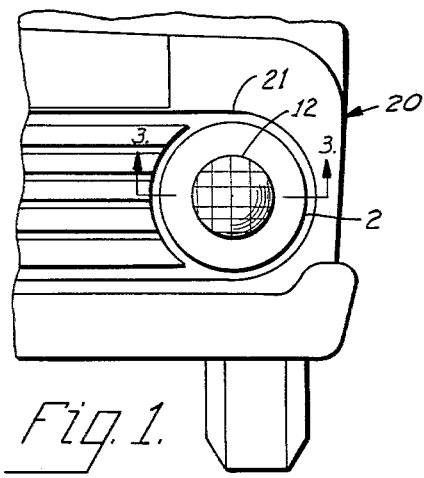
Fig. 1.
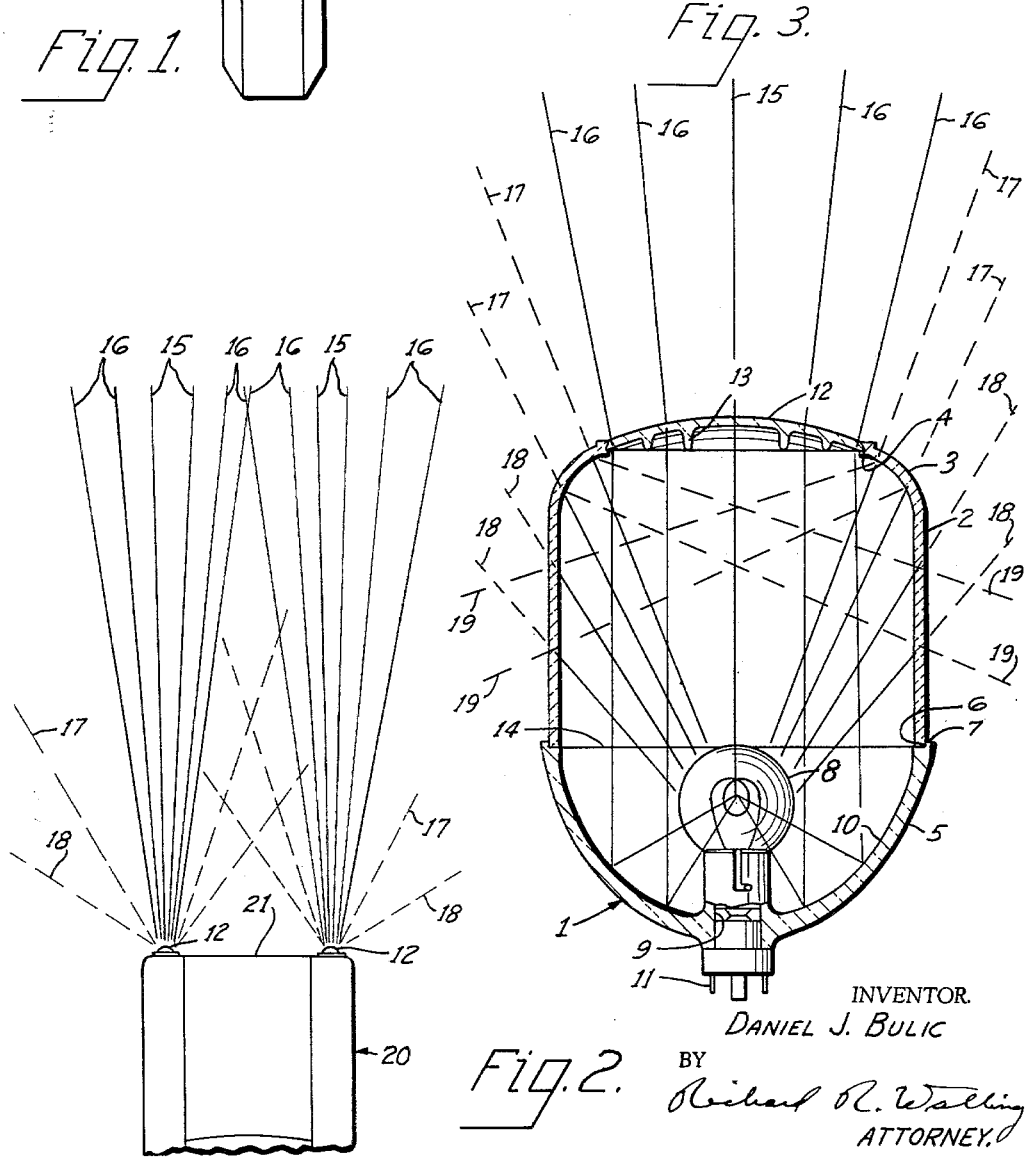
Fig. 2.
Fig. 3.
INVENTOR.
DANIEL J. BULIC
BY
Richard R. Walling
ATTORNEY.

Nov. 23, 1965 D. J. BULIC 3,219,809
GLARELESS HEADLIGHT
Filed May 31, 1963 2 Sheets-Sheet 2

INVENTOR.
DANIEL J. BULIC
BY
ATTORNEY.

United States Patent Office 3,219,809
Patented Nov. 23, 1965

3,219,809
GLARELESS HEADLIGHT
Daniel J. Bulic, 1561 Longwood Drive,
Mayfield Heights, Ohio
Filed May 31, 1963, Ser. No. 284,421
11 Claims. (Cl. 240—7.1)

This invention relates generally to antiglare vehicle headlights, and more specifically to antiglare automobile headlights.

Prior art antiglare headlights are characterized by two main groups. One group employs various mechanical arrangements such as vanes, shutters, and the like. In the other group, a plurality of adjustable or fixed reflectors are positioned to prevent glare. The first group is particularly objectionable as the vanes, shutters and similar apparatus employed decrease the intensity of light emitted by a headlight to such an extent that the roadway is improperly illuminated and adversely affects the vision of the driver of the vehicle on which said headlights are mounted. In the second group, auxiliary reflectors are adjusted to provide light beams lowered forwardly of and/or diverted sideways of the path of a vehicle. Such arrangements, by reducing optimum illumination of the roadway, reduce the maximum efficiency of the driver of the vehicle. Both groups are disadvantageous as such devices are expensive and complicated to install. Also, because they require frequent maintenance including adjustment, lubrication, and cleaning, they fail to perform their intended function unless constant attention and expense are devoted to their use.

It is, therefore, an object of this invention to provide vehicle headlights which effectively illuminate the path of the vehicle for a driver thereof and, at the same time, prevent interference with the vision of a driver of an approaching vehicle by substantially eliminating glare.

It is another object of the invention to provide antiglare vehicle headlights which may be simply and economically constructed and easily installed.

It is a further object of the invention to provide antiglare vehicle headlights which, after installation, require no greater adjustment expense and maintenance than conventional headlights now in use.

It is a still further object of the invention to provide an antiglare vehicle headlight housing which is adapted to be readily attached to either conventional or sealed-beam single and dual headlights.

It is still another object of the invention to provide antiglare vehicle headlights and/or headlight housings which provide effective illumination of the roadway forward of and along the sides of a vehicle under adverse conditions of visibility caused by fog, snow, rain, and the like.

The above and additional objects and advantages will appear from the following description, the claims appended and the accompanying drawings, in which:

FIG. 1 is a fragmentary front elevational view showing a single headlight unit mounted on the front panel of an automobile;

FIG. 2 is a top plan view showing two single headlight units of the invention individually mounted one on each side of the front panel of an automobile, and the pattern of the emitted light rays;

FIG. 3 is a longitudinal sectional view taken on the line 3—3 of FIG. 1;

Figure 4:
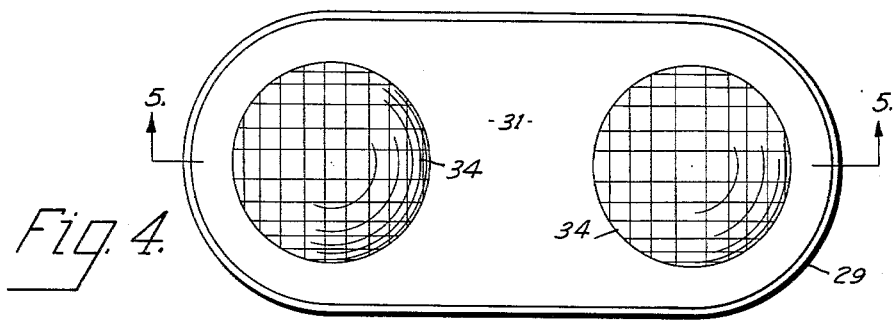
FIG. 4 is a front plan view of a dual reflector and dual lens vehicle headlight unit.

Referring to the drawings, FIG. 3 shows a single headlight unit, indicated generally at 1, and which comprises a housing 2 constructed with a rounded front-edge portion 3 which is provided with a shoulder 4. The housing is connected to a reflector 5 at housing ledge 6 and reflector flange 7 in any suitable manner, such as by the use of conventional adhesives and the like. A lamp 8 is mounted in an aperture 9 in the rear wall 10 of the reflector and may be connected to a source of electrical current through contacts 11.

A lens 12 provided with grooves 13 is mounted in the front wall of the housing 2 in a plane normal to a plane extending through the longitudinal axis of the headlight 1. The lens 12 has a diameter less than the maximum diameter of the reflector 5 and greater than the maximum diameter of the lamp 8 to serve as a partial shield for the lamp, and is spaced sufficiently forward of the reflector edge 14 to provide proper illumination of the forward path of the vehicle for the driver and at the same time prevent the light rays emitted by the headlight unit 1 from interfering with the vision of the driver of an approaching vehicle. The grooves 13 serve to form the light rays transmitted by the lens 12 in a horizontal divergent pattern forward of the vehicle. If grooves are not provided, the rays will be transmitted as a concentrated spotlight beam which does not effectively illuminate the roadway.

The front edge portion 3 of housing 2 extends forwardly from reflector edge 14 a predetermined distance for the proper spacing of lens 12 from reflector edge 14 to provide concurrent effective illumination of the road and shielding of the lamp to prevent interference with the vision of a driver of an approaching vehicle. When the housing 2 is constructed of translucent or partially transparent material, the front edge portion 3 thereof must be rounded to reflect light rays rearwardly and downwardly so that they will be transmitted by said housing as diffused light to illuminate the road forward and along the sides of the vehicle. If the housing 2 is constructed of non-opaque material, the rounded portions are not required and may be replaced by any suitable construction.

The reflector 5 may be of any desired shape, but preferably is cup-shaped, as illustrated.

The housing 2 is preferably translucent so that the light rays striking the inner periphery of said housing are transmitted as diffused rays which serve to illuminate portions of a vehicle body on which the headlight is mounted, and also to illuminate the road directly forward of and along the sides of the vehicle. Also, in an especially preferred embodiment, the housing 2 may be pale yellowish-green in color, each color comprising about 50% of the total to provide illumination of black-top roads and for penetrating hazy atmospheric conditions caused by fog, smoke, rain, snow, and the like. Various colored housings such as blue, amber, yellow and green have been evaluated, but the above yellowish-green color has been found far more effective for the above mentioned purposes than any of the other colors investigated.

Although the housing 2 is preferred to be of any desired translucent material, such as plastic or glass which will transmit diffused light, it may be made of any solid material incapable of transmitting light rays at the sacrifice of illumination of the vehicle body and roadway under normal or the above mentioned adverse atmospheric conditions.

The housing containing one or more lenses is preferably constructed in combination with a reflector and lamp as a complete single or dual beam headlight unit for installation as original or replacement vehicle equipment. However, the housing including one or more lenses spaced forwardly of the reflector edge may also be constructed so that it is adapted for connection to a previously mounted single or dual beam vehicle headlight. In the latter arrangement, the housing is connected to the front edges of previously mounted reflectors of a headlight in which the original lens is either retained or removed. While in some cases the original lens may be retained in the headlight, the light rays must then pass through both the headlight and the housing lenses at a sacrifice in intensity of illumination of the road. Consequently, it is preferred to remove the lens or lenses from previously mounted headlights prior to connecting the housing thereto.

The lens 12 may be of any conventional material and construction provided the above defined relative dimensional specifications and specified forward position relative to the reflector edge are adhered to. Generally, a clear glass lens provided with grooves 13 capable of forming a divergent horizontal light ray pattern forwardly of a vehicle is employed.

The light rays 15 emitted directly from the lamp 8 and rays 16 reflected from the reflector 5 are transmitted by the lens 12 and form a pattern of horizontally divergent rays directed forwardly of the vehicle, but said rays are not diverged to the extent that they interfere with the vision of the driver of an approaching vehicle. The light rays 18 and some of the rays 17 which impinge on the inner periphery of the housing 2 are directly transmitted without rearward reflection as diffused rays. Some of the light rays 17 which strike the rounded front edge portions 3 of housing 2 are reflected diagonally rearwardly and transmitted by said housing as rays 19 in a downward direction to illuminate both the sides of the vehicle and the road adjacent the sides of the vehicle.

The said headlight 1 is mounted in the front panel of an automobile 20, as shown in FIG. 1.

In FIG. 2, the pattern of the light rays transmitted from the lens 12 of the single headlight unit 1 is shown for each of two individual headlight units mounted at each side in the front panel 21 of the automobile 20.

Figure 5:
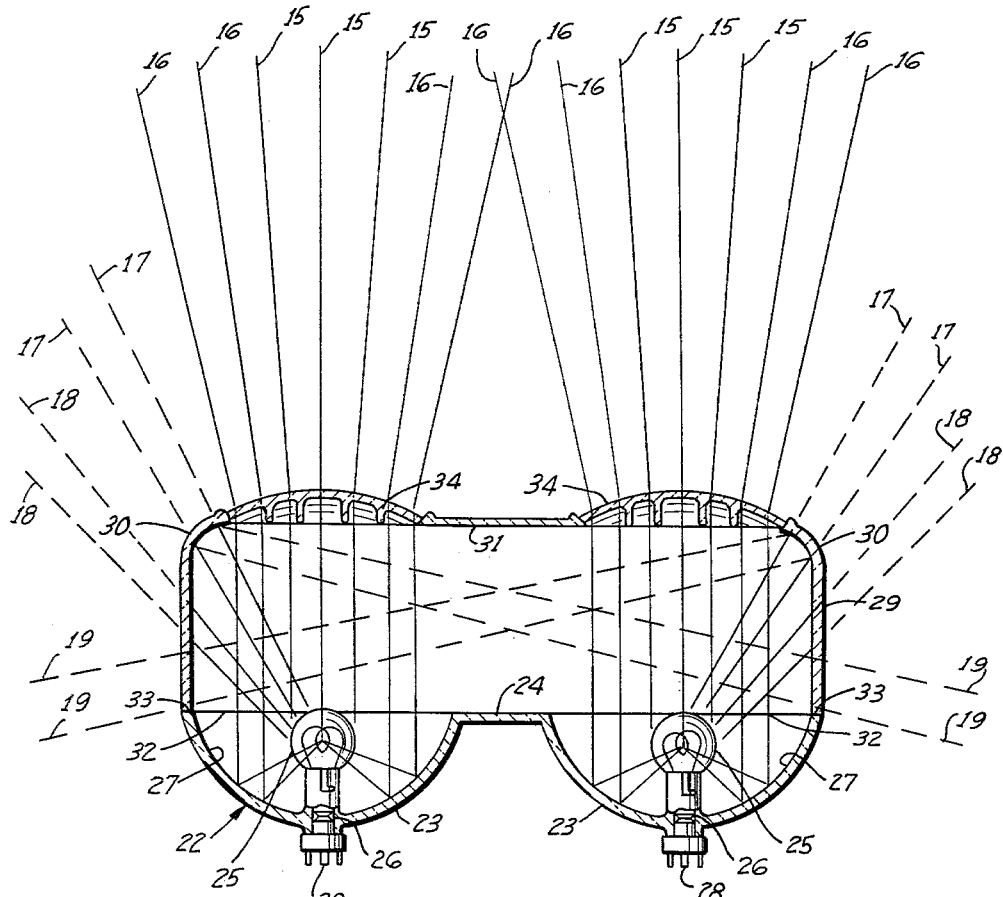
FIG. 5 is a longitudinal sectional view taken on the line 5—5 of FIG. 4.

Referring to FIG. 5, the dual lens, dual reflector modification of headlight unit 1 is shown generally at 22. The dual reflectors 23 are joined together by the flat portion 24. The lamps 25 are mounted at the rear of the reflectors and extend through openings 26 in the rear reflector walls 27, and are provided with contacts 28 for connection to a suitable source of current.

A housing 29, constructed with rounded front-edge portions 30 and a front wall 31 is connected to reflectors 23 in any conventional manner at reflector edges 32 and housing edges 33 so that the front wall 31 extends forwardly of said edges. Two lenses 34 are mounted in the front edge portions of housing 29 in a plane normal to a plane extending through the longitudinal axis of the unit 22 with their inner edges connected to the front wall portion 31.

The materials from which the reflectors 23 and the housing 29 are constructed and the relative dimensional specifications of the lenses and their specified forward location relative to the front edges of the reflectors are the same as described above for the single headlight unit 1.

Although several embodiments of the invention have been described in detail, many modifications and alterations are possible and all such variations are included in the scope of the invention as appear in the appended claims.

Having thus described my invention, I claim:

1. An anti-glare vehicle headlight unit comprising at least one reflector having an open front end, a lamp mounted in said reflector, a translucent housing connected to the front edge of said reflector and having a front edge portion extending forwardly of said open end, a lens provided with grooves for forming a divergent horizontal light ray pattern forwardly of the vehicle mounted in said front edge portion in a plane normal to a plane passing through the longitudinal axis of said reflector, said lens mounted sufficiently forward of said reflector edge and having a diameter greater than the maximum diameter of said lamp and less than the maximum diameter of said reflector to provide proper vision for the driver of the vehicle and to prevent the light rays emitted by said lamp from interfering with the vision of a driver of an approaching vehicle, said housing having rounded front edge portions for transmitting light rays impinging on the surfaces of said edge portions rearwardly towards the opposite rear wall portions of said housing to illuminate the forward portion of the vehicle.

2. A vehicle headlight unit according to claim 1 wherein the reflector is cup-shaped.

3. A vehicle headlight unit according to claim 1 wherein the reflector and housing are each cup-shaped, and the reflector and housing are connected to each other at the edges of their open front and rear ends, respectively.

4. An anti-glare vehicle headlight reflector housing having a front edge portion and an open rear end adapted for attachment to the front edge of a headlight reflector, a lamp mounted in said reflector, a lens provided with grooves for forming a divergent horizontal light ray pattern forwardly of the vehicle mounted in said front edge portion on a plane normal to a plane passing through the longitudinal axis of the reflector, said lens mounted sufficiently forward of said reflector edge and having a diameter greater than the maximum diameter of said lamp and less than the maximum diameter of said reflector to provide proper vision for the driver of the vehicle and to prevent the light rays emitted by said lamp from interfering with the vision of a driver of an approaching vehicle, said housing being translucent and having rounded front edge portions for transmitting light rays impinging on the surfaces of said edge portions rearwardly toward the opposite rear wall portions of said housing to illuminate the forward portion of the vehicle.

5. A headlight reflector housing according to claim 4 wherein the housing is cup-shaped.

6. An antiglare vehicle headlight reflector housing according to claim 4, wherein the reflector and housing are each cup-shaped and the reflector and housing are connected to each other at the edges of their open front and rear ends, respectively.

7. An antiglare vehicle headlight unit comprising two reflectors having open front ends, said reflectors being disposed in side-by-side relation and spaced substantially from each other and joined by flat wall portions defining an open passage between said reflectors, a lamp mounted in each of said reflectors, a translucent housing connected to the front ends of said reflectors, said housing having front-edge portions and a front wall portion, two lenses provided with grooves for forming a divergent horizontal light ray pattern forwardly of the vehicle mounted in said front-edge portions in a plane normal to a plane passing through the longitudinal axis of said reflectors and in spaced lateral position with the inner edges of each lens connected to said front wall portion, said lenses mounted sufficiently forward of said reflector ends and having diameters greater than the maximum diameters of said lamps and less than the maximum diameters of said reflectors to provide effective illumination for the driver of the vehicle and to prevent the light rays emitted by said lamps from interfering with the vision of a driver of an approaching vehicle, said housing having rounded front edge portions for transmitting light rays impinging on the surfaces of said edge portions rearwardly toward the opposite rear wall portions of said housing to illuminate the forward portion of the vehicle.

8. A vehicle headlight unit according to claim 7 wherein the reflectors are cup-shaped.

9. A vehicle headlight unit according to claim 7 wherein the reflector and housing are each cup-shaped and the reflector and housing are connected to each other at the edges of their open front and rear ends, respectively.

10. An antiglare vehicle headlight reflector housing having front edge portions, a front wall, an open rear end adapted for attachment to the front edges of two headlight reflectors, said reflectors being disposed in side-by-side relation and spaced substantially from each other and joined by flat wall portions defining an open passage between said reflectors, a lamp mounted in each reflector, two lenses provided with grooves for forming a divergent horizontal light ray pattern forwardly of the vehicle mounted in said edge portions in a plane normal to a plane passing through the longitudinal axis of said reflectors and in spaced lateral position with the inner edges of each lens connected to said front wall portion, said lenses mounted sufficiently forward of said reflector edges and having diameters greater than the maximum diameters of said lamps and less than the maximum diameters of said reflectors to provide effective illumination for the driver of the vehicle and to prevent the light rays emitted by said lamps from interfering with the vision of a driver of an approaching vehicle, said housing being translucent and having rounded front edge portions for transmitting light rays impinging on the surfaces of said edge portions rearwardly toward the opposite rear wall portions of said housing to illuminate the forward portion of the vehicle.

11. An anti-glare vehicle headlight reflector housing according to claim 10, wherein the reflector and housing are each cup-shaped and the reflector and housing are connected to each other at the edges of their open front and rear ends, respectively.

References Cited by the Examiner

UNITED STATES PATENTS

| | | | |
|---|---|---|---|
| 1,331,422 | 2/1920 | Donaldson | 240—41 |
| 1,410,077 | 3/1922 | Peck | 240—41.3 |
| 1,557,563 | 10/1925 | Dahlstrom | 240—41 |
| 1,573,451 | 2/1926 | Rein | 240—41.4 |
| 1,854,101 | 4/1932 | Browne. | |
| 1,891,846 | 12/1932 | Stauber | 240—46.53 |
| 2,138,079 | 11/1938 | Taylor et al. | |
| 2,552,389 | 5/1951 | Arenberg et al. | 240—7.35 |
| 2,602,135 | 7/1952 | Nordquist | 240—7.35 |
| 2,970,209 | 1/1961 | Glowzinski et al. | 240—7.1 X |

EVON C. BLUNK, *Primary Examiner.*

NORTON ANSHER, *Examiner.*